(12) United States Patent
Bolton et al.

(10) Patent No.: US 8,745,053 B2
(45) Date of Patent: Jun. 3, 2014

(54) METHOD FOR MANAGING MAINFRAME OVERHEAD DURING DETECTION OF SENSITIVE INFORMATION, COMPUTER READABLE STORAGE MEDIA AND SYSTEM UTILIZING SAME

(75) Inventors: Benjamin R. Bolton, Stanton, CA (US); James M. Sagawa, Redwood City, CA (US); Martin D. Casey, Story, WY (US); Jan D. Narkiewicz, San Jose, CA (US); Pierre R. Fichaud, Montreal (CA)

(73) Assignee: Xbridge Systems, Inc., Mountain View, CA (US)

( * ) Notice: Subject to any disclaimer, the term of this patent is extended or adjusted under 35 U.S.C. 154(b) by 67 days.

(21) Appl. No.: 13/038,275

(22) Filed: Mar. 1, 2011

(65) Prior Publication Data

US 2012/0226689 A1     Sep. 6, 2012

(51) Int. Cl.
*G06F 17/30* (2006.01)

(52) U.S. Cl.
USPC .............. 707/736; 707/708; 726/22; 711/117

(58) Field of Classification Search
USPC ........ 707/755, 736, 708; 726/27, 22; 711/117
See application file for complete search history.

(56) References Cited

U.S. PATENT DOCUMENTS

| | | | |
|---|---|---|---|
| 5,832,522 A | 11/1998 | Blickenstaff et al. | |
| 6,269,382 B1 | 7/2001 | Cabrera et al. | |
| 6,772,409 B1 | 8/2004 | Chawla et al. | |
| 7,149,746 B2 | 12/2006 | Fagin et al. | |
| 7,320,122 B2 | 1/2008 | Chawla et al. | |
| 7,426,512 B1 | 9/2008 | Ben-Natan | |
| 7,426,520 B2 | 9/2008 | Gorelik et al. | |
| 7,437,362 B1 | 10/2008 | Ben-Natan | |
| 7,472,114 B1 | 12/2008 | Rowney et al. | |
| 7,506,371 B1 | 3/2009 | Ben-Natan | |
| 7,673,344 B1 | 3/2010 | Rowney et al. | |
| 7,680,828 B2 | 3/2010 | Gorelik | |
| 7,693,877 B1 | 4/2010 | Zasman | |
| 7,720,889 B1 | 5/2010 | Goodson et al. | |
| 2001/0047372 A1 | 11/2001 | Gorelik et al. | |
| 2004/0225645 A1 | 11/2004 | Rowney et al. | |
| 2005/0027723 A1 | 2/2005 | Jones et al. | |
| 2005/0086252 A1 | 4/2005 | Jones et al. | |
| 2005/0183143 A1* | 8/2005 | Anderholm et al. ............ 726/22 |
| 2005/0210006 A1* | 9/2005 | Robertson et al. ................ 707/3 |
| 2006/0005247 A1 | 1/2006 | Zhang et al. | |
| 2006/0059154 A1 | 3/2006 | Raab | |
| 2006/0101268 A1 | 5/2006 | Cornuejols et al. | |
| 2006/0184549 A1 | 8/2006 | Rowney et al. | |
| 2006/0224589 A1 | 10/2006 | Rowney et al. | |

(Continued)

OTHER PUBLICATIONS

May 25, 2012 Non-Final Office Action issued by U.S. Patent Office for corresponding U.S. Appl. No. 13/038,235 pp. 1-26.

(Continued)

*Primary Examiner* — Jean M Corrielus
(74) *Attorney, Agent, or Firm* — Intellectual Innovations Legal Advisors

(57) ABSTRACT

Examples of methods, systems, and computer-readable media for managing mainframe overhead during detection of sensitive information are described using multiple techniques. The techniques may include manipulating a scan definition, defining scan parameters and limitations, utilizing user-supplied scan filters, and using a redrive operation. The redrive operation may include halting one or more analysis requests associated with scan definitions, storing a redrive position for each analysis request, and resuming the servicing of analysis requests at the redrive position for each request.

23 Claims, 7 Drawing Sheets

(56) References Cited

U.S. PATENT DOCUMENTS

| | | |
|---|---|---|
| 2006/0253476 A1 | 11/2006 | Roth et al. |
| 2006/0282429 A1 | 12/2006 | Hernandez-Sherrington et al. |
| 2006/0282470 A1 | 12/2006 | Yu et al. |
| 2006/0291580 A1* | 12/2006 | Horvitz ............... 375/265 |
| 2007/0094394 A1 | 4/2007 | Singh et al. |
| 2007/0112864 A1 | 5/2007 | Ben-Natan |
| 2007/0174337 A1 | 7/2007 | LaVergne et al. |
| 2007/0185868 A1 | 8/2007 | Roth et al. |
| 2007/0271548 A1 | 11/2007 | Chawla et al. |
| 2009/0012972 A1 | 1/2009 | Leitner |
| 2009/0094274 A1 | 4/2009 | Gorelik et al. |
| 2009/0100344 A1* | 4/2009 | Heuler et al. ............ 715/733 |
| 2009/0100402 A1* | 4/2009 | Heuler et al. ............ 717/100 |
| 2009/0158441 A1* | 6/2009 | Mohler et al. ............ 726/27 |
| 2009/0204812 A1 | 8/2009 | Baker et al. |
| 2009/0271453 A1 | 10/2009 | Ben-Natan |
| 2009/0300054 A1 | 12/2009 | Fisher et al. |
| 2010/0131512 A1 | 5/2010 | Ben-Natan et al. |
| 2010/0131758 A1 | 5/2010 | Ben-Natan |
| 2010/0132024 A1 | 5/2010 | Ben-Natan et al. |
| 2010/0332481 A1 | 12/2010 | Rowney |
| 2011/0093471 A1 | 4/2011 | Brockway et al. |
| 2011/0238827 A1 | 9/2011 | Lunsford |
| 2012/0066183 A1* | 3/2012 | Adkins et al. ............ 707/649 |
| 2012/0102056 A1* | 4/2012 | Guirard ............... 707/755 |
| 2012/0226677 A1 | 9/2012 | Bolton et al. |
| 2012/0226858 A1 | 9/2012 | Steitz et al. |
| 2012/0278866 A1* | 11/2012 | Huang ............... 726/4 |
| 2012/0297146 A1* | 11/2012 | Guthrie et al. ............ 711/141 |

OTHER PUBLICATIONS

Sep. 25, 2012 filed Response to May 25, 2012 Non-Final Office Action issued by the U.S. Patent Office for corresponding U.S. Appl. No. 13/038,235 pp. 1-11.

Feb. 13, 2013 Final Official Action issued by the U.S. Patent Office for corresponding U.S. Appl. No. 13/038,235 pp. 1-31.

May 13, 2013 filed Response to Feb. 13, 2013 Final Office Action issued by the U.S. Patent Office for corresponding U.S. Appl. No. 13/038,235 pp. 1-11.

Sep. 5, 2013 Non-Final Office Action Issued by the U.S. Patent Office for corresponding U.S. Appl. No. 13/038,285 pp. 1-13.

* cited by examiner

| KEY | VALUE |
|---|---|
| POS 315 | MINIMUM LENGTH FOUND AT POSITION |
| | MAXIMUM LENGTH FOUND AT POSITION |
| | COUNT FOUND AT POSITION |
| | SAMPLE SIZE |
| | ACCUMULATED LENGTH |
| | VIABILITY FLAG |
| POS 315 | MINIMUM LENGTH FOUND AT POSITION |
| | MAXIMUM LENGTH FOUND AT POSITION |
| | COUNT FOUND AT POSITION |
| | SAMPLE SIZE |
| | ACCUMULATED LENGTH |
| | VIABILITY FLAG |
| POS 315 | MINIMUM LENGTH FOUND AT POSITION |
| | MAXIMUM LENGTH FOUND AT POSITION |
| | COUNT FOUND AT POSITION |
| | SAMPLE SIZE |
| | ACCUMULATED LENGTH |
| | VIABILITY FLAG |

FIGURE 3

METHOD FOR MANAGING MAINFRAME OVERHEAD DURING DETECTION OF SENSITIVE INFORMATION, COMPUTER READABLE STORAGE MEDIA AND SYSTEM UTILIZING SAME

TECHNICAL FIELD

Embodiments of the invention relate generally to discovery and identification of sensitive information, and particularly to managing mainframe overhead during the discovery and identification of sensitive information on mainframe systems.

BACKGROUND

The electronic storage of sensitive information may present a risk of inadvertent disclosure to the organization storing the information. Accordingly, organizations may review their data storage facilities for the presence of sensitive information, such as credit card or social security numbers.

When organized records of structured data storage facilities are present, organizations can conduct a review of those data storage facilities to identify the presence of sensitive information and to assess the risk of unauthorized access of the sensitive information. It has been found, however, that organizations are typically unable to conduct a review of older or unstructured data sets for the presence of sensitive information. Additionally, mainframe systems for such organizations are often in persistent use, and cannot be taken offline to identify sensitive information. Stringent restrictions on the amount of mainframe processing usage further complicate matters. Accordingly, these organizations are typically forced to assume the risk of the unauthorized access or dissemination of sensitive information.

There are guidelines, such as the Payment Card Industry Data Security Standard (PCI DSS), which may help organizations understand how to effectively discover and protect sensitive information. However, these guidelines are generally agnostic regarding the operating system where the data is stored, and mainframe systems tend to be excluded from serious consideration in automated sensitive information discovery applications.

BRIEF DESCRIPTION OF THE DRAWINGS

FIG. 3 is a schematic illustration of a map which may be stored in the map storage of FIG. 1.

DETAILED DESCRIPTION

Certain details are set forth below to provide a sufficient understanding of embodiments of the invention. However, it will be clear to one skilled in the art that embodiments of the invention may be practiced without various aspects of these particular details. In some instances, well-known circuits, control signals, timing protocols, computer system components, and software operations have not been shown in detail in order to avoid unnecessarily obscuring the described embodiments of the invention.

Embodiments of the present invention pertain to the identification of sensitive information in mainframe systems. Mainframe systems are computer systems generally used by organizations for bulk data processing applications. Mainframe systems are accordingly designed to store and manipulate large amounts of data. The mainframe system may include one or more processors that may be optimized for efficient access of the large amounts of data accessible to the mainframe. The data is typically organized in data sets, with each data set containing many records—currently for example gigarecords or terarecords being possible in some files. Mainframe systems may operate using particular operating systems, including but not limited to as z/OS and OS390. Embodiments of the present invention may allow for the identification of sensitive information stored in mainframe systems. Challenges for dealing with data discovery on mainframe systems include extremely large data sets, lack of operating system-imposed directory structure, expensive and tightly controlled CPU usage, and older non-standard data storage techniques.

Sensitive information as used herein refers to data that may encode personal information regarding individuals, groups, or entities. Generally, sensitive information includes any information, the storage of which creates a risk to the storing organization of the inadvertent disclosure of the information, such as information that is subject to privacy rules or regulations. Examples of sensitive information include, but are not limited to, credit card numbers, social security numbers, names, and addresses.

General embodiments of systems and methods for identifying sensitive information in mainframe systems have been described in copending application Ser. No. 13/038,235 entitled "Methods for Detecting Sensitive Information in Mainframe Systems, Computer Readable Storage Media And System Utilizing Same," which application is hereby incorporated herein by reference in its entirety for any purpose. Processing cycles on mainframe systems may be valuable and well-scheduled. Accordingly, embodiments of the present invention may advantageously reduce or minimize the impact to a mainframe server of analyzing the mainframe's data repositories for sensitive information.

Figure 1:
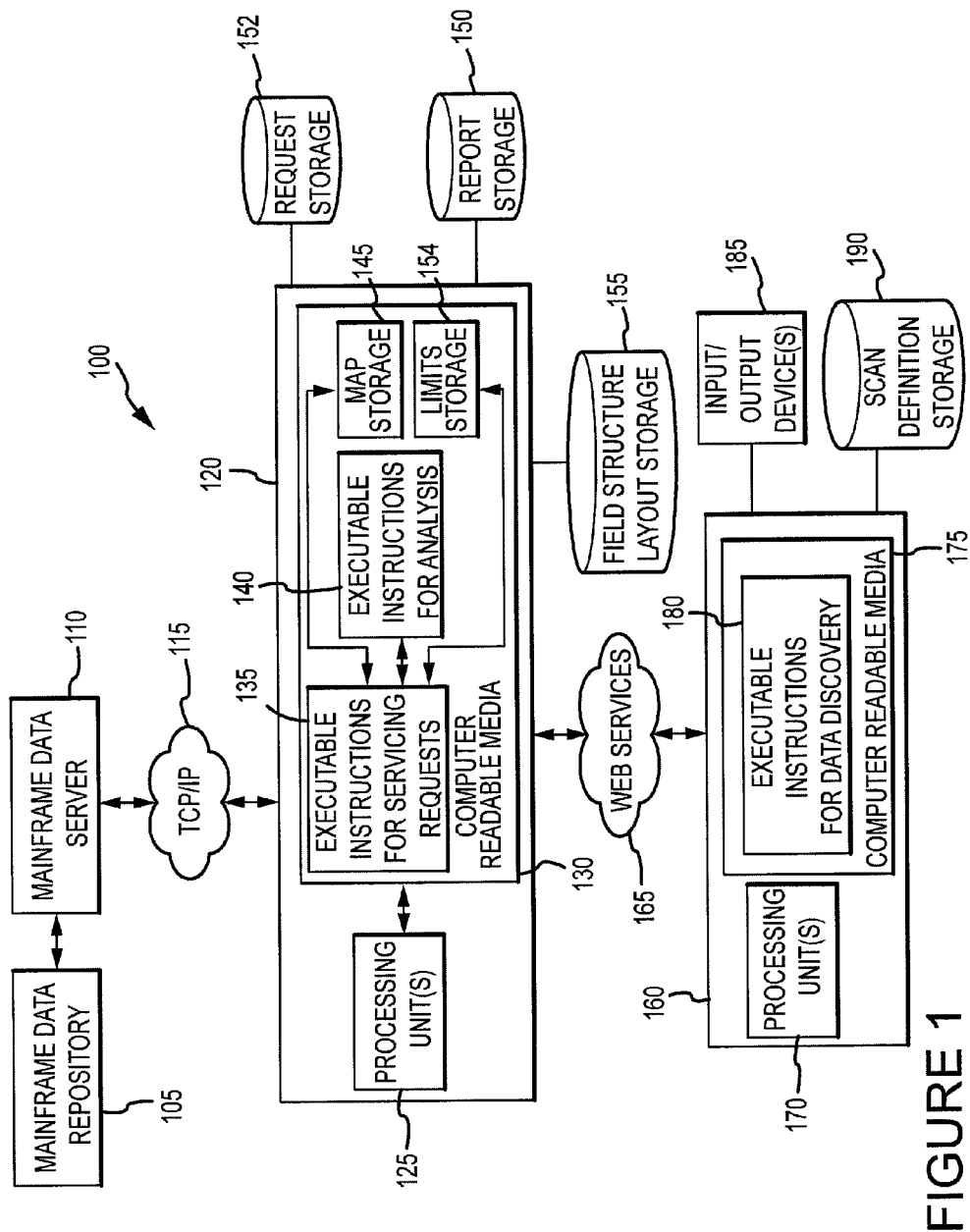
FIG. 1 is a schematic illustration of a data detection system in accordance with an embodiment of the invention.

FIG. 1 is a schematic illustration of a data detection system 100 in accordance with an embodiment of the present invention. A mainframe data repository 105 may store data accessible to a mainframe data server 110. The mainframe data repository 105 may store large amounts of data, including potentially sensitive information in data sets. Generally, any type of electronic storage may be used as the mainframe data repository 105, and there may be more than one mainframe data repository in the data detection system 100. The mainframe data repository 105 may store data in the form of data sets formatted in accordance with a mainframe system architecture, including but not limited to, an IBM zArchitecture data set, such as z/OS or OS390.

Mainframe data server 110 may interface with mainframe data repository 105 for the bulk processing of data stored on the mainframe data repository 105. Accordingly, the mainframe data server 110 generally includes one or more processing units and memory encoded with executable instructions to process data on the mainframe data repository 105, often in a bulk manner. The particular arrangement and contents of the mainframe data repository 105 and the mainframe data server 110 is quite flexible, and generally any mainframe system may be used. In some embodiments, the mainframe data repository 105 may include hierarchical storage for migrating data between portions of the mainframe data repository 105 having relatively faster and slower data access times. Embodiments of the present invention that may be particularly advantageous for use with hierarchical storage are described further in copending application Ser. No. 13/038,285 entitled "Method for Managing Hierarchical Storage During Detection of Sensitive Information, Computer Readable Storage Media and System Utilizing Same," which application is hereby incorporated herein by reference in its entirety for any purpose.

The mainframe data server 110 may include memory encoding executable instructions that operate in conjunction with processing unit(s) of the mainframe data server 110 to provide functionality allowing the transfer of one or more blocks of records in requested data sets from the mainframe data repository 105 to other components described below over TCP/IP network 115. Data originally stored on the mainframe data repository 105 may be communicated through mainframe data server 110, and subsequently transmitted via TCP/IP protocol 115 to servicing and analysis engines 120 for analysis of the data to identify sensitive information. Although TCP/IP protocol 115 is shown, any communication mechanism, wired or wireless may be used.

The servicing and analysis engines 120 may include one or more processing units 125 and computer readable media 130. The term computer readable media herein is used to refer to a single computer readable medium in some embodiments and in some embodiments multiple computer readable media in communication with one or more processing unit(s). The computer readable media 130 may store executable instructions for servicing requests 135, executable instructions for analysis 140, and map storage 145. The executable instructions for servicing requests 135 may include instructions for reading the data contained on mainframe data repository 105, examples of which will be described further below. The executable instructions for analysis 140 may include instructions for locating sensitive information in data received from the mainframe data repositories, further examples of which are provided below. Although the executable instructions for servicing requests 135 and the executable instructions for analysis 140 are shown on a same computer readable media 130, in some embodiments either or both sets of instructions may be provided on multiple computer readable media, and may not be resident on the same media. Computer readable media herein may include any form of computer readable storage or computer readable memory, including but not limited to externally or internally attached hard disk drives, solid-state storage (such as Flash media), tiered storage solutions, or a storage area network. Generally, the servicing and analysis engines 120 may also be referred to as a 'servicing engine' herein and an 'analysis engine', where the servicing engine refers generally to the executable instructions for servicing requests 135 executed by one or more processing unit(s) 125 and the analysis engine refers to the executable instructions for analysis 140 executed by one or more of the processing unit(s) 125, or other processing unit(s).

Report storage 150, request storage 152, limits storage 154, and field structure layout storage 155 may be accessible to the servicing and analysis engines 120 for storage of data generated or accessed by the servicing and analysis engines 120. In some embodiments, map storage 145 may be stored in computer readable media 130 as shown above, however map storage 145 may also be stored in other locations, such as on a disk and accessible to the servicing and analysis engines 120. Similarly, limits storage 154 may be stored in computer readable media 130 as shown in FIG. 1, however the limits storage 154 may also be stored in other locations, including on the mainframe server or the computer system 160, or distributed amongst several locations. Contents and use of the map storage 145, report storage 150, request storage 152, and field structure layout storage 155 will be described further below.

The limits storage 154 may store a representation of any of a variety of limits which may be placed on the activity of the servicing and analysis engines 120. The limits may advantageously reduce the impact to the mainframe of operating the servicing and analysis engines 120 in some embodiments. Limits may be placed on activity at a global level for a particular mainframe host or across hosts. Limits may be placed on activity at a scan level, and may be included in a scan definition. Limits may be placed on activity at an individual data set level. Further examples of limits and the use of limits are described further below.

A computer system 160 may be in communication with the servicing and analysis engines 120 for user interaction with the servicing and analysis engines 120 over web services 165. In other examples, input/output devices and user interaction may be communicated directly to the servicing and analysis engines 120 through a local user interface. Data produced by the servicing and analysis engines 120 may be communicated to computer system 160 via web services 165. Web services 165 may utilize any viable communication protocol, such as TCP/IP, and may be transmitted over a variety of network mechanisms, wired or wireless, such as the internet. The computer system 160 may include a processing unit 170, and computer readable media 175, which may store executable instructions for data discovery 180. User subsystem 160 may further be coupled to one or more input/output devices 185, as well as to scan definition storage 190. As will be described further below, a user may interact with the computer system 160 using one or more of the input/output devices 185 to define one or more scan definitions to be stored in the scan definition storage 190 and/or communicated to the servicing and analysis engines 120. cause the servicing and analysis engines 120 to identify sensitive information stored in the mainframe data repository 105, and may access stored data regarding the presence or absence of sensitive information on the mainframe data repository 105.

Any variety of input/output devices 185 may be used, including but not limited to displays, keyboard, mice, network interconnects, wired or wireless interfaces, printers, video terminals, storage devices, and any combination thereof. It is to be further understood that the arrangement of the computing components described in FIG. 1 and the location of those components is flexible. Additionally, it should be understood that the mainframe data repository 105, mainframe data server 110, servicing and analysis engines 120, and computer system 160 may be implemented as independent components of a distributed system. In particular, the processing unit(s) used to service requests and analyze data for sensitive information described herein may be different than the processing unit(s) of the mainframe data server 110 used to manipulate the data in the mainframe data repository 105 during normal operation.

Figure 2:
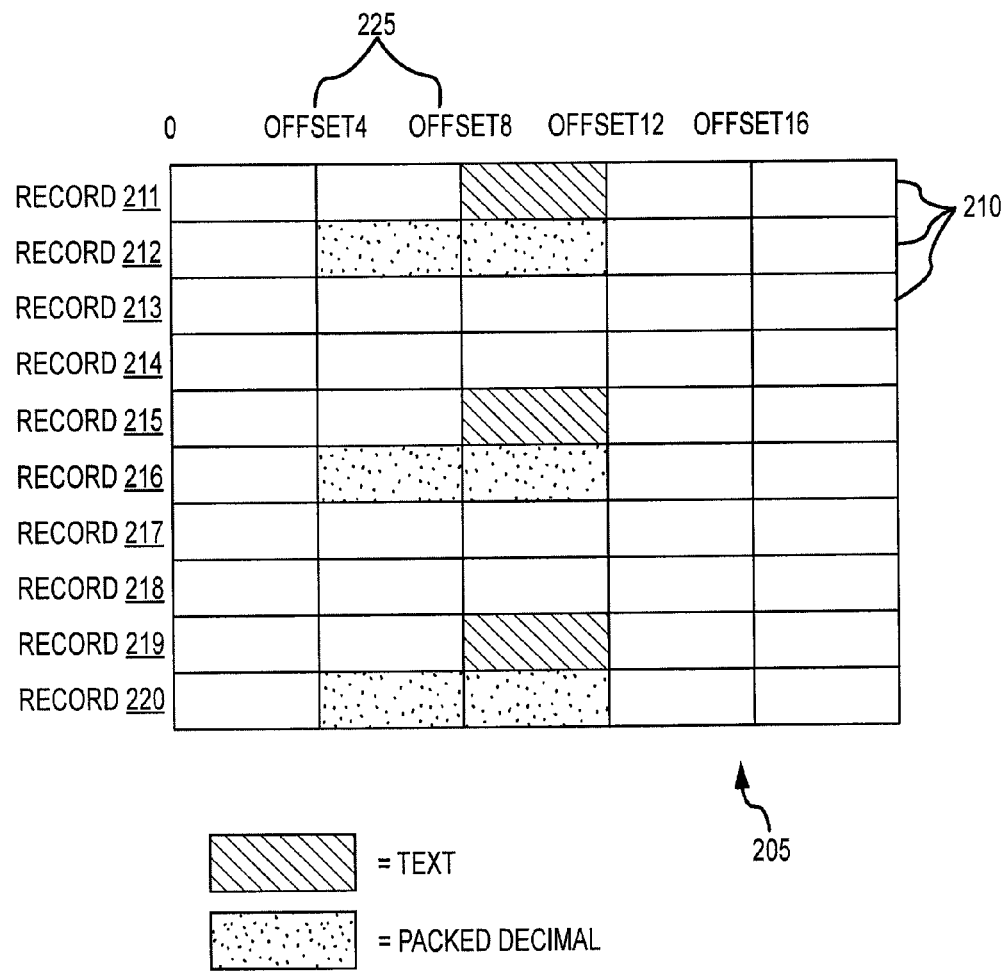
FIG. 2 is a schematic illustration of a block of data records within a data set which may be stored in the mainframe data repository of FIG. 2.

FIG. 2 is a schematic illustration of a portion of a data set 200 which may be stored in the mainframe data repository 105 of FIG. 1. The data set 200 may be grouped into one or more data blocks 205 divided into separate data records 210. The illustrated data block 205 includes 10 data records, data record 211 through data record 220. Each data record 210 may have a certain length, and may have one or more record layout types. Example record layouts may include a variety of data types, such as names, addresses, numbers, and other data types. Because the data found in records 210 may be structured or unstructured, the data records may have no definable record layout. For structured record layouts, data fields may be arranged within a record at regular byte offsets 225. For example, a record layout may have a field defined as "order number" located at offset 4.

While some data blocks 205 may have consistent record layouts across records, other data blocks 205 may include multiple record layouts within the same data block 205. For example, in the illustrated embodiment, every fourth record has a textual non-numeric field such as "order name," while the remaining records in the block contain numeric payment information fields. The determination of data set structure and record layout is typically dependent on programming decisions, as well as the applications used on the system. However, because record layout may be quite varied, and the information needed to create a pre-defined layout description might not be readily available, a pre-defined record layout information may not be available to support sensitive information discovery. For example, in applications programmed with COBOL, multiple record layouts within a single block are possible using the REDEFINES operation. As shown in the illustrated example, records 211, 215, and 219 have a textual field beginning at offset 8, while records 212, 216, and 220 have a packed decimal format beginning at offset 4. The number of record layouts is not limited, and a variety of layouts are possible across the same data set.

FIG. 3 is a schematic illustration of a map 300 which may be stored in the map storage 145 of system 100 of FIG. 1. Map storage 145 may reside in computer readable media 130 or may be persistently stored on an external disk. The map 300 may include a metrics portion 305 and a position portion 310 relating to the position of potential packed decimal fields discovered by system 100. Examples of the discovery process are described further below. Position portion 310 may contain an entry for each potential packed decimal field location 315, along with a corresponding metrics portion 305 for each field location 315 within a record. For every potential packed decimal field location 315, metrics portion 305 may include a minimum length found (element 330), a maximum length found (element 335), a count found (element 340), a sample size value 345, an accumulated length value 350, and a viability flag 355.

The map 300 may be generated during a pre-examination of a first block or other group of records, where the first block or other group of records are searched for packed decimal indicators. When a packed decimal indicator is found at a position, the servicing engine 120 may make an entry in the map corresponding to that position. The servicing engine 120 may then update the metrics portion 305 associated with that position, and the remainder of the first block or other group of records may be searched. The minimum length of a field found at position value 330 and maximum length found at position value 335 may contain the minimum and maximum lengths for all fields found at the corresponding field location 315. That is, the minimum length may reflect the smallest packed decimal field located at that position within the first block of pre-examined records, while the maximum length may reflect the longest packed decimal field located at that position within the first block of pre-examined records. Count found at position 340 may contain the number of times a packed decimal field was found at a given field location 315 within the first block or other group of records. Sample size 345 may contain the number of records contained in the first block or other group of records. In some embodiments, other derived metrics may be calculated from the values stored in map 300 in the metrics portion 305. For example, in order to determine the average length of a potential packed decimal field at a field location 315, the accumulated length 350 for all potential packed decimal fields may be stored, and then divided by sample size 345. Similarly, in order to determine the frequency of potential packed decimal values are found at a particular field location 315, the count found at position 340 may be divided by the sample size in order to determine the percent found at field location 315. Depending on global user defined configuration values and the scan definition, if the metrics portion 305 reaches user defined minimums, the viability flag 355 may be set to indicate a potentially viable packed decimal field location. The metrics may be computed and updated by the servicing engine 120 described above. The executable instructions for servicing requests 135 described above may include instructions for conducting a pre-examination as described herein to generate the map 300.

Figure 4:
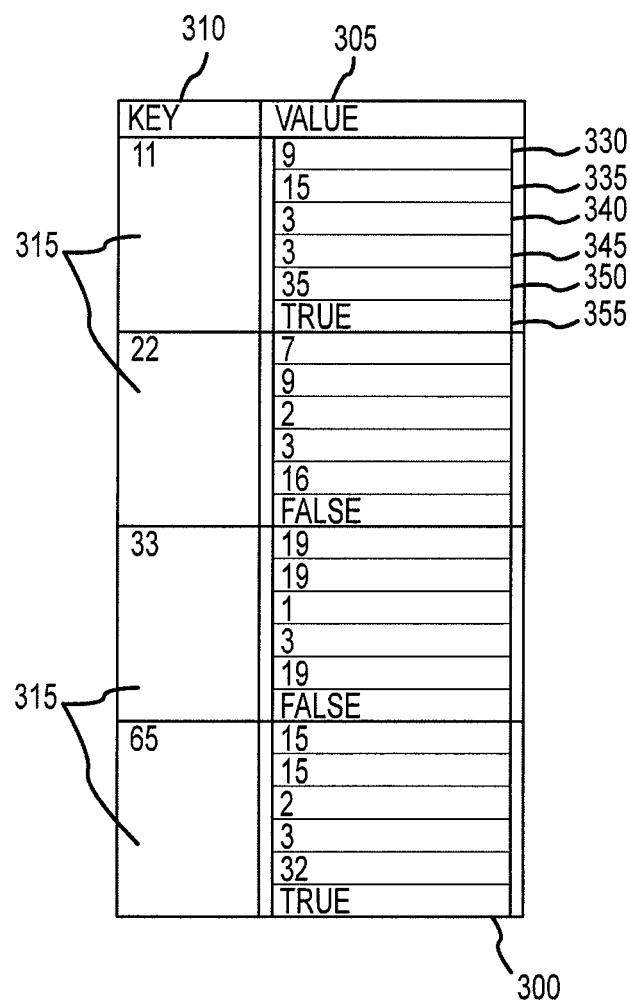
FIG. 4 is a schematic illustration of sample values that may be found in the map of FIG. 3.

FIG. 4 illustrates a schematic illustration of a map 300 populated with sample values. As shown, field locations 315 indicate potential packed decimal fields at positions 11, 22, 33, and 65. Accordingly, there is a corresponding entry in metrics portion 305 for each field location. As shown in FIG. 4, the minimum length found (recorded in element 330) in all records of the pre-examined records was 9, and the maximum length found (recorded in element 335) was 15. This means that the packed decimal fields found at those locations range between the sizes of 9 and 15. Additionally, the count found (recorded in element 340) indicates that 3 potential packed decimal fields were found at position 11, during a pre-examination sample size (element 345) of 3. Accordingly there was a packed decimal field 3 out of 3 times, indicating a likely packed decimal location. The accumulated length value 350 for field position 11 is 35, further indicating the total length of all 3 potential packed decimal fields is 35. The average length may be calculated by dividing accumulated length (recorded in element 350) by the count found (recorded in element 340). This length is sufficiently long to contain sensitive information (such as a credit card or social security number. Accordingly, in the example shown, the fields found at position 11 may have met the global user defined configuration values, and so the viability flag 355 has been set to "true," by the servicing engine 120, thereby indicating potentially viable sensitive information resides at a field location 315 of 11. Examples of this process are described further below. In some examples, if the average length value indicates the field is too short to contain sensitive information, the viability flag may be set to "false" by the servicing engine. In other examples, other criteria may be used to evaluate the information stored in the map 300 to determine if a field is a viable sensitive information field, and therefore may be worth the system resources to analyze it. As will be described further below, the servicing engine 120 may utilize the map 300 of FIG. 4 to efficiently process the remainder of records in a data set. For example, the map 300 of FIG. 4 indicates positions 11 and 65 may be viable sensitive information locations. Accordingly, the servicing engine 120 may pass only fields at positions 11 and 65 to an analysis engine to identify sensitive information. In this manner, the analysis engine may not need to search for sensitive information in the entirety of all records, but only those fields identified by the map 300.

Having described a basic configuration of a system, a data set, and a map according to embodiments of the present invention, techniques for detecting sensitive information will now be described. Techniques described below may be implemented through cooperation of executable instructions encoded on the computer readable media 130 and 175, and executed by the processing units 125 and 170 in some examples.

Figure 5:
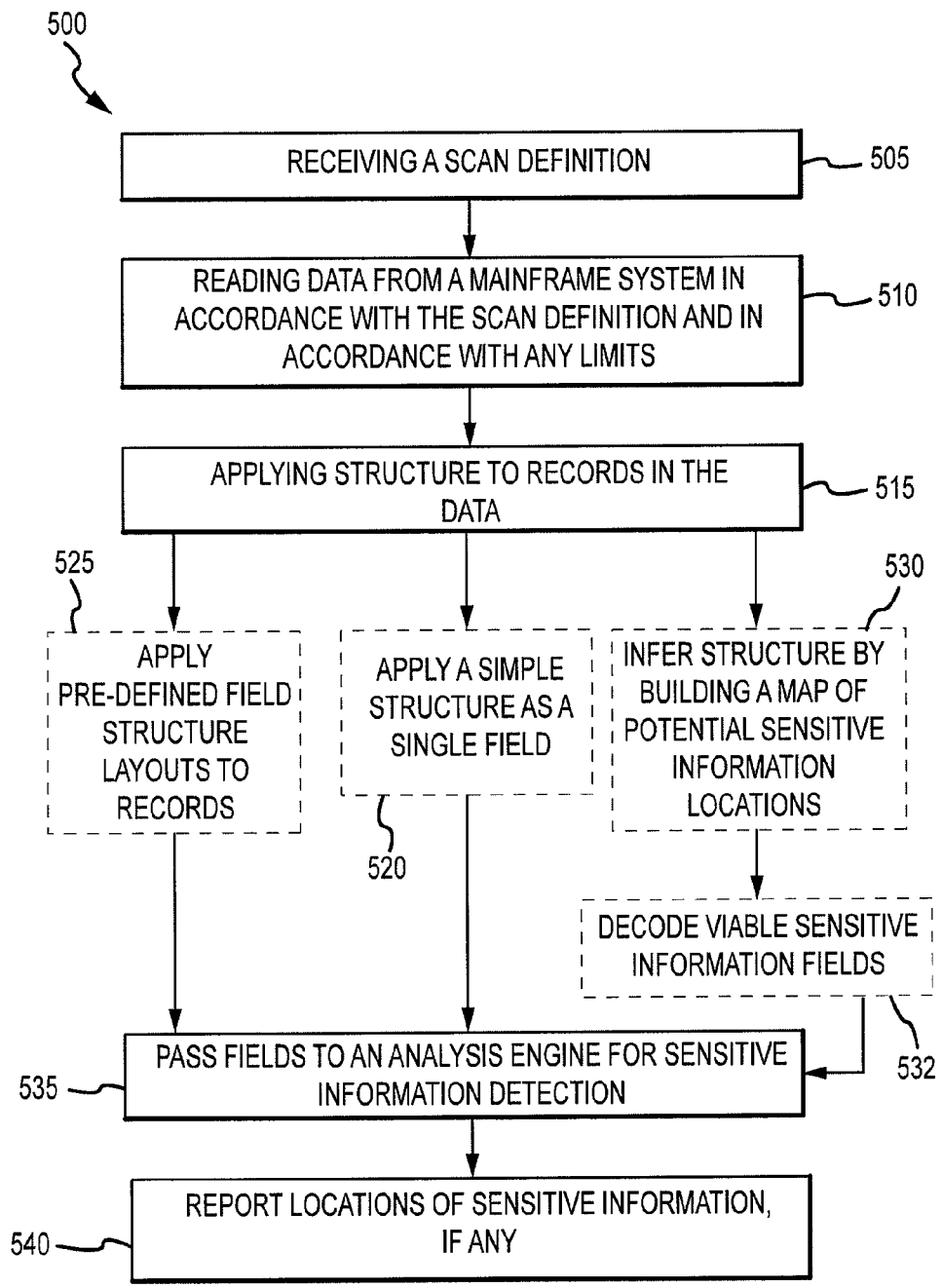
FIG. 5 is a schematic flowchart for one embodiment of a method to detect sensitive information in the mainframe system of FIG. 1.

A schematic flowchart for a method 500 to detect sensitive information in mainframe system 100 according to an embodiment of a method of the present invention is shown in FIG. 5. At method step 505, a scan definition may be received at the servicing and analysis engines 120. In some embodiments, multiple alternative scan definitions may be received by system 100. Referring back to FIG. 1, the scan definition may contain a description of all or a subset of the cataloged data sets stored in the mainframe data repository 105 to be analyzed by the servicing and analysis engines 120. The scan definition may be created by a user using the computer system 160 in some examples. The scan definition may be stored in the scan definition storage 190 of FIG. 1, may be transmitted to the servicing and analysis engines 120, or both. The scan definition may be specified manually by a user using input/output devices 185, or may be automatically generated by a computer software process, such as by accessing stored scan definitions from scan definition storage 190.

In some embodiments, a scan definition may include a name, source description, and a variety of scan parameters that describe which data sets are to be analyzed by the servicing and analysis engines 120. For example, scan parameters may include the name of the mainframe data repository 105 where the desired data resides, a list of data sets to be analyzed, a list of user-supplied filters, a list of limitations that are to be placed on the servicing and analysis engines 120, or combinations thereof. A scan definition may contain a flag to indicate if all the data sets with pre-defined record layouts are to be analyzed. If such a flag is set, every data set or table stored in the mainframe data repository 105 that has pre-defined record layouts may be analyzed by the servicing and analysis engines 120. When alterations are made to a scan definition, a log may be created and stored in report storage 150 identifying the user who creates or modifies the definition, along with the associated date and time.

Referring again to the method set forth in FIG. 5, data may be read from a mainframe system in accordance with a scan definition and any applicable limits at method step 510. For example, referring back to FIG. 1, the executable instructions for servicing 135 may generate one or more analysis requests for data residing in the mainframe data repository 105. The analysis requests may be stored in the request storage 152 of FIG. 1. Generally, each analysis request may correspond to one data set of the mainframe data repository 105. Each analysis request may contain the name of the requested data set, its current status, the results of any analysis, the number of hits found, the run number, media type, and a redrive value, which will be described further below. In some embodiments, one or more analysis requests may be generated for each scan definition. Accordingly, the executable instructions for servicing requests 135 may include instructions for defining one or more analysis requests based on a scan definition. The servicing and analysis engines 120 may then communicate with the mainframe data server 110 to cause the mainframe data server to access data sets specified by the analysis requests in accordance with any limitations specified in the scan definition, or any applicable limitations specified on a global, scan, or data set specific level by the mainframe or other system which may be stored in the limits storage 154 of FIG. 1 or other location.

After receiving the relevant portions of the scan definition at the servicing and analysis engines 120, the executable instructions for servicing 135 may transmit instructions to the mainframe data server 110, which may then communicate with the mainframe data repository 105 to read, pre-examine, and analyze the requested data sets. In other examples, a scan definition may not be used, and the servicing and analysis engines 120 access data sets requested in some other manner. Upon execution of the request, data sets may be read from the mainframe data repository 105 one block of records at a time, which may then be processed one record at a time, in accordance with the other limitations and restrictions specified in the scan definition or by global configuration items or other storage limitations. In some examples, a redrive value may be set.

A scan definition may also include filters for restricting the data serviced and analyzed by the servicing and analysis engines 120. User-supplied scan filters may include, but are not limited to, instructions identifying specific data sets for analysis, or excluding particular undesired data sets from the scan definition. For example, scan filters may include instructions identifying specific subsets of data sets on a mainframe by name, size, media type, volume, or other criteria to be included in the list of analysis requests associated with the scan definition. Analysis requests associated with a scan definition may be serviced and subsequently analyzed by the servicing and analysis engine 120 to identify the location of sensitive information. The scan definition may therefore control overhead by limiting which data sets on the mainframe will be serviced and subsequently analyzed.

Further, user-supplied scan limitations may include, but are not limited to, various maximum and minimum limits placed upon the servicing and analysis engines 120, scan scheduling restrictions, a regular expression pattern to be used to exclude data sets with a matching name from the list of analysis requests that must be serviced and analyzed, or combinations thereof. The user-supplied scan limitations may include a variety of user-definable values. In some embodiments, a default analysis limit value may be included in a scan definition or may be globally defined. The default analysis limit may indicate a maximum number of records that the scanning engine will read and analyze per data set. This value may be an upper limitation on the number of records that will be processed by the servicing and analysis engines 120 without finding any hits for potentially sensitive information. The default analysis limit may be a comparably high number of records, and sensitive information hits, if any, will have been expected well before the scanning and analysis engines 120 reach this limit.

In some embodiments, limitations that are placed on servicing and analysis engines 120 may be defined globally, at the scan level (such as part of the scan definition), or at the request level for individual data sets. Globally defined parameters may apply to all scans and all requests generated by the servicing and analysis engines 120. Scan level limitations may apply to all requests being executed as part of the corresponding scan definition. Request level limitations may only apply to the servicing and analysis of a particular data set or analysis request. While limitations may be defined at one level, compliance with these limitations may be actually enforced by the servicing and analysis engines 120 at a different level. For example, a globally defined maximum may be enforced at the scan level by the servicing engine 120. Executable instructions for servicing 135 of FIG. 1 may further include instructions for identifying when a limitation or condition has been met or exceeded on any level, and accordingly halting servicing of analysis requests, or preventing new analysis request servicing from being initiated.

One example of a limitation is a limit on a number of active requests per scan. Accordingly, an active requests per scan value may be defined and stored, for example, in the limits storage 154 of FIG. 1. The active requests per scan value may indicate a maximum number of data sets within one scan definition that may be concurrently serviced and analyzed, while an active requests per host value may indicate a maximum number of data sets that may be concurrently serviced and analyzed on a particular mainframe host. Limiting these values may reduce the chances of the servicing and analysis engines 120 becoming a burden on mainframe resources and thereby reducing the mainframe's operational capabilities. That is, limits on the number of concurrent data sets to service and analyze may avoid the servicing and analysis engines 120 monopolizing cycles of the mainframe server.

Other limitations may be more results oriented, including a hit limit per request maximum value, which may be stored in the limits storage 154 of FIG. 1. This value may provide the maximum number of sensitive information hits per data set after which the system will stop reading the data set from the mainframe server. The hit limit per request limit may be sufficiently high such that if it is reached it likely indicates that the data set may contain large amounts of sensitive information, and may therefore be in need of serious risk mitigation. In this manner, the entire data set may be reported as containing sensitive information, and all records in the data set may not be scanned after the maximum number of sensitive information hits has been reached. That is, the executable instructions for servicing 135 of FIG. 1 may include instructions for halting the servicing and analyzing of a request when a maximum number of hits has been reached for that request, or in some examples, for that data set.

Another type of limitation that may be specified is a limit on active requests per media type. A mainframe host may utilize a variety of media types which may include, but is not limited to, hard disks, virtual tape, tape, hierarchic data, IMS (IBM Information Management System database management system), DB2 (IBM DB2 database management system), Unix file systems, or combinations thereof. Certain media types may perform faster or slower, or may also have other limitations, such as physical restrictions for certain media types. For example, tape drives have a limited number of readers that may be used. By limiting scan requests per media type, scan efficiency may be improved or maximized. Accordingly, limits storage 154 may store a limit on a number of active requests per media type of the mainframe data repository 105. As analysis requests are serviced, the servicing and analysis engines 120 may identify which media types the requested data is stored on, and if the number of active requests per media type is exceeded, the servicing and analysis engines 120 may halt the reading of data from that media type of the mainframe data repository.

The servicing and analysis by media type functionality may be further enhanced by providing a mechanism to dynamically change limitations by both media type and by schedule. The availability of a certain media resources, such as tape, may be more limited during some schedule windows and more available at others. Accordingly, in some embodiments, a user may define one or more time schedule limitations for each media type. The schedules may be stored in limits storage, as part of a scan definition in the scan definition storage, or in another location accessible to the servicing and analysis engines 120. The schedules may allow the limit associated with a particular media type to vary over any time period. However, the variability may typically occur over the course of hours within a day, days within a week, and/or days within a month. For example, the limit for simultaneously servicing multiple requests associated with data sets that have a media type of tape may have an absolute max of 40. A user may have a variety of reasons for such limitations, such as resources for a total of 50 tape drives while ensuring that there will always be 10 tape drives free for other usage. The user may then schedule a lower limit, for example 30 tape drives, for schedule windows when additional tape drives are needed for scheduled processing every Monday, Wednesday, and Friday between 3:00 A.M. and 5:00 A.M. when partial backups are performed. A further reduced limit of 10 may be required on Saturday and Sunday between 9:00 P.M. and 5:00 A.M. when a full system back is performed. In some embodiments, an even further restrictive limit of 0 tape drives may be set on the first 5 days of every month for system month-end processing, for example. As the servicing and analysis engines 120 service analysis requests, they may enforce these limits on the timing and manner in which the requests are serviced.

Another limitation that may be enforced is an inter read delay value. The inter read delay value may be stored in any computer readable storage media accessible to the scanning and analysis engines 120, such as the limits storage 154. When present, the inter read delay value may specify an amount of delay between each read request for a block of mainframe data set records. That is, the executable instructions for servicing shown in FIG. 1 may include instructions for limiting requests for blocks of data records to include an amount of delay between requests that is greater than or equal to the inter read delay value. The inter read delay value may be specified by a user using computer system 160 or may be specified in some embodiments by an operator of the mainframe server. This delay may be increased in order to further reduce processing burden from all read requests initiated by the servicing of analysis requests for a mainframe system.

Another limitation that may be enforced by the servicing and analysis engines 120 is a schedule window. The schedule window may specify the time period in which any analysis requests identified by a scan definition may be serviced by the servicing engine. A schedule window may include a start time value and a stop time value, and may be set to be active on only particular days of the week. Optionally, the scan window may be designated by a user, globally defined for the system, set to default values, or disabled entirely. If all the analysis requests currently being serviced for a given scan definition are not complete at the stop time, the servicing engine may suspend all the requests currently being serviced for that scan definition, and resume servicing analysis requests for that scan definition at the next window start time. This process may be continued until all the analysis requests for the scan definition have completed or are suspended due to other limits that may exist.

As was described above, data sets stored in the mainframe data repository 105 may not have a structure that is known to the servicing and analysis engines 120. Accordingly, in order to detect sensitive information in the data sets, structure may be applied to records in the data as set forth in method step 515 in the method set forth in FIG. 5. Referring to FIG. 1, the executable instructions for servicing 135 may include instructions for applying structure to records in the data sets, and may operate in cooperation with the processing unit(s) 125 to apply structure to the data sets. Applying structure to data sets generally refers to identifying fields within a record, and may also include identifying and decoding the content of fields. Applying structure does not modify the data itself, rather the organization of the data is identified.

Depending on the scan definition being employed, and the data serviced and analyzed, a variety of techniques may be used to apply structure to the data blocks being processed. The servicing and analysis engines 120 may apply structure in accordance with the executable instructions for servicing 135, or with other executable instructions. As shown in method 500 illustrated in FIG. 5, several exemplary techniques are shown for applying structure to data sets during the servicing process. Any combination of techniques may be used in different examples, including in some examples using only one of the techniques set forth in method steps 520, 525, 530, and 532, using only two such techniques, or using a combination of such techniques. The dashed lines surrounding method steps 520, 525, 530 and 532 indicate the selective nature of these method steps—all three need not be used, but all three may be used in some examples—and different techniques may be used for different records in some examples.

In the technique set forth in method step 520, a simple structure of the data set may be inferred. Using this technique, a data set, or block of records from a data set, may be analyzed as if it has a record layout comprising a single field which begins at the start of the record and ends at the end of the record. For example, this may be possible because a simple data set may be a long unencoded string of text that is ready for regular expression analysis. Accordingly, a simple source template may be used by the servicing engine 120, and the data may be passed directly to the analysis engine for sensitive information analysis because the records are already partitioned by a field.

In the technique of method step 525, a pre-defined field structure layout may be applied to records. This technique may be utilized in examples when the structure of all or some of the data is known prior to the initiation of the servicing of the request. If the record structure of an accessed data set, or block of records from a data set is known, then the precise location and length of data fields within a record and across records is known and may be stored as a pre-defined field structure layout. For example, as illustrated in FIG. 2, a pre-defined field structure layout for the block 205 shown may describe a layout with a textual field at offset 8 with a length of 4 for records 211, 215, and 219, as well as packed decimal fields at offset 4 with a length of 8 for records 212, 216, and 220. These pre-defined field structure layouts may be stored in field structure layout storage 155 of FIG. 1, and may be accessed by the servicing and analysis engines 120 when needed during servicing. Accordingly, this technique may permit the servicing and analysis engines 120 to read every field individually for later analysis for sensitive information. However, because structure may not always be known prior to initiation of a the process of servicing a request, other techniques may be used in addition to or instead of the use of a pre-defined field structure layout.

In the technique of method step 530, structure may be inferred by building a map of potential sensitive information locations in the data set. The map may be generated by the servicing engine 120, for example the executable instructions for servicing 135 may include executable instructions for generating the map, and may operate in cooperation with the processing unit(s) 125 to generate the map. Method step 530 may be used when the structure of a data set has not been pre-defined or is unknown. In some embodiments, all records to be analyzed may be examined for packed decimal indicators, decoded, and analyzed immediately using any found packed decimal indicators. In some embodiments, however, a portion of records may be pre-examined by the servicing engine to generate the map. The map may then be used by the servicing engine to identify viable sensitive information fields in other data records and pass only those viable sensitive information fields to the analysis engine. In some examples, the servicing engine may read only those viable sensitive information fields in the remaining records to decode and pass to the analysis engine.

In some examples, then, the servicing engine 120 may generate a map containing locations corresponding to packed decimal indicators in pre-examined records. Sensitive information may be contained in packed decimal fields. Packed decimal format is a data format that may be commonly used in mainframe systems. Packed decimal format generally refers to a format in which two decimal digits may be stored in one byte of data. Each byte contains two nibbles, and each nibble may represent a decimal digit. The lower nibble of the rightmost byte is typically used to encode the sign of the data using a hexadecimal digit. For example, 'C' may be used to denote a positive sign and 'D' to denote a negative sign. Because sensitive information is often numerical, such as for example credit card numbers and social security numbers, the location of packed decimal fields may provide an initial indication of a possible location for sensitive information.

Accordingly, a pre-examination of a first data block in a data set may be conducted in method step 530, and the structure of that data set may be determined. The determined data structure may then be applied to the remaining data blocks in the data set. Depending on the structural patterns of the pre-examined block as found in the map 300, similar potentially sensitive information may be detected in the subsequent data blocks of the data set. Examples of this process are described further below. After structure has been inferred in method step 530, candidates for viable sensitive information fields are then decoded to an analyzable format in method step 532. The fields may be decoded, for example, by the servicing engine 120 of FIG. 1. For example, the executable instructions for servicing 135 may include instructions for decoding viable sensitive information fields, and the executable instructions for servicing 135 may operate in cooperation with the processing unit(s) 125 to decode the viable sensitive information fields. After these fields are decoded, they may be analyzed for potentially sensitive information as described further below.

In method step 535, the fields detected by the techniques described in method steps 520, 525, and 530 may be passed to the analysis engine 120. In some embodiments, a regular expression analysis engine may be used to analyze the passed fields in order to detect potentially sensitive information. The servicing and analysis engines 120 may perform the analysis in accordance with the executable instructions 140 or other executable instructions. The servicing and analysis engines 120 may compare the returned potentially sensitive fields to known sensitive information formats, such as 9-digit social security numbers, or 13 digits for encoding credit card numbers. During analysis of the data, data encoded in non-ASCII formats, such as EBCDIC may be converted to ASCII for processing.

In method step 540, during and/or after analyzing the passed fields, the locations of sensitive information, if any, may be stored in report storage 150. A user may then access report storage 150 to view the stored locations of sensitive information. The analysis engine 120 may further record and aggregate the locations of both sensitive and non-sensitive information. That is, the executable instructions for analysis 140 may include instructions for analyzing fields passed to the analysis engine and may include instructions for recording and aggregating the results. The instructions for analysis 140 may operate in cooperation with the processing unit(s) 125 to conduct the analysis and provide the results. The results returned by the analysis engine 120 may be stored in report storage 150 of FIG. 1. Report storage 150 may contain results such as the count of records read, the number of records analyzed, hits found, and errors encountered. Specific information regarding the detected presence of potentially sensitive and the detected likely absence of sensitive information within the mainframe data repository 105, including data locations and masked content, may be stored at the record, block, data set, scan, or even at the system level within report storage 150. Accordingly, a user at the user subsystem 160 may access all information related to the stored reports stored at report storage 150 through web services 165.

Figure 6:
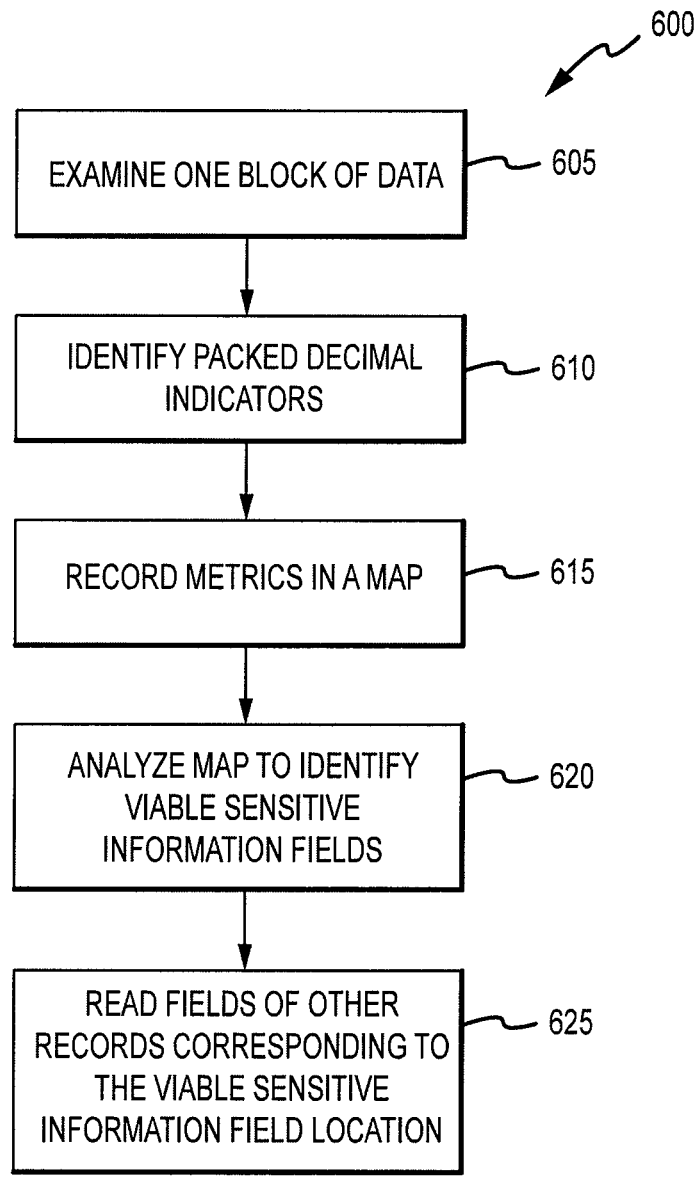
FIG. 6 is a schematic flowchart for one embodiment of a method of inferring data structure to identify potentially sensitive information in accordance with an embodiment of the present invention.

Having described examples of methods for analyzing data sets stored in a mainframe system in FIG. 5, further examples of methods for inferring structure will now be described. FIG. 6 is a schematic flowchart for a method 600 to infer structure of a data set by building a map of potential packed decimal locations in mainframe system according to an embodiment of a method of the present invention. The method 600 may be used to implement method step 530 of FIG. 5. Referring to FIG. 6, in method step 605, a pre-examination may be performed by examining a sample number of, or all, records from the first block of records read from a requested data set in the mainframe data repository 105 with the servicing and analysis engines 120. In some examples, the first block 205 of data may be temporarily stored into a memory buffer in order to avoid the excess time otherwise needed to re-read records. After the first block 205 of data is read, in method step 610 packed decimal indicators may be identified. As described above, each record of the block 205 may be read one record at a time, and examined by searching for packed decimal indicators. A packed decimal indicator in a record may be identified by a bit pattern of 0xC or 0xD, or hexadecimal C or D, using the EBCDIC representation of the data. Hexadecimal C or D may generally correspond to trailing sign bits for packed decimal numbers, and are found by evaluating the low nibbles, or half bytes, of the EBCDIC encoded numbers. As such, once a 0xC or 0xD has been discovered, if its high nibble is a decimal digit, it is possible that a packed decimal number immediately precedes the half byte. It should be noted, however, that despite what may be detected, discovery of a C or D hexadecimal indicator may simply be a coincidental string of binary digits. Accordingly, discovery of potential packed decimal sign bits C and D may not be an absolute guarantee of a packed decimal number. Once a packed decimal indicator has been detected, the bytes immediately preceding the indicator may be checked by the servicing engine to verify a potential packed decimal field exists at that location. After a non-decimal digit is discovered, such as A, B, C, D, E, or F in either nibble of an EBCDIC byte, the method 600 may assume that the previous byte represents the first two digits in the potential packed decimal. The estimated length may be the total number of decimal digits discovered for the potential packed decimal. This is an estimate because the bytes in the record may coincidentally contain two numeric decimal digits that may not be actually part of the original packed decimal value. The identification of potential packed decimal indicators may be performed by the servicing engine 120 of FIG. 1, where the executable instructions for servicing 135 may include instructions for identifying packed decimal indicators and may operate in cooperation with the processing unit(s) 125 to identify the packed decimal indicators.

In step 615 of the method 600 set forth in FIG. 6, the locations of the potential packed decimal fields may be stored in a map 300 together with associated metrics, as shown in map 300 of FIG. 3. For each potential packed decimal field that is read and identified by the servicing and analysis engines 120, the potential field location 315 may be stored in position portion 310 of map 300, along with corresponding metrics values as shown in FIGS. 3 and 4 for later analysis. Additionally, the estimated length for each found potential packed decimal field will be used to augment the values in a metric portion of the map 305 as shown in FIG. 3 for its corresponding position. For example, this may include replacing the minimum length found at position 330 if the estimated length is less than the current minimum length found at position 330 for the metric entry at that field location 315. Similarly, the maximum length found at position 335 may be replaced if the estimated length is greater than the current maximum length found at position 335. The estimated length may be added to the accumulated length 350, and the count found 340 will be incremented. At any point, typically after the map has been completed, these metrics can be used to calculate the average field length and percent found at the field location 315, in order to ultimately determine viability for purposes of the viability flag 355.

In method step 620, the map 300 is analyzed to identify viable sensitive information fields. This process may include pattern identification in order confirm inferences of packed decimals at particular locations within records in the pre-examined block 205. To improve performance, user defined configuration values defined at the global, policy, scan, or request level may be used to augment the map by setting the viability flag 355 for each position capable of containing sensitive information as determined by the user defined configuration values in comparison to the metrics for that position. For example, if a potential packed decimal field is continually found in the same position within a record, it will have a high percentage for percent found, which may be calculated from the metrics found in the map at a position using the formula of count found at position 340 divided by sample size 345. Accordingly, the higher percent found, the higher the likelihood a packed decimal field exists at that location. If percent found is 100%, it is almost certainly a packed decimal field location, and may be indicated as such. However, due to the varied programming practices detailed above, there is a chance that percent found is less than 100%. The servicing and analysis engines 120 may be configured to accept a potential packed decimal field as a viable sensitive information field based on a percent threshold. In some examples, the packed decimal indicator must reside at the same location across records for a minimum of 70% of the total records in order to be considered a viable sensitive information field. Other thresholds may be used, including 60%, 65%, 75%, 80%, 85%, or any other threshold. The threshold may be configurable by the user as a user defined configuration value from the user subsystem 160, and stored in storage accessible to the servicing and analysis engines 120. This threshold may also be optionally disabled by a user in examples where REDEFINES or other causes of non-uniform record structure never occur or are not likely to have occurred. To avoid having to perform this calculation for each record analyzed, the viability flag may be updated and stored in the map 300, thereby using its value in future iterations requiring this calculation.

Additionally, other patterns may be identified during the analysis of potentially viable sensitive information fields. Sensitive information may be of a certain predictable length. As mentioned above, because 9 digits are needed to store for social security numbers, and 13-16 digits are needed for credit card numbers, potential packed decimal fields of this length are more likely viable candidates for analyzing the potential packed decimal location for sensitive information. Accordingly, the servicing and analysis engines 120 may increase the weight for potential packed decimals of this length. That is, the servicing and analysis engines 120 may be more likely to set a viability flag to "true" when the average packed decimal field length is 9 or between 13 and 16. Similarly, if the maximum field length 330 is less than 9 digits long, the likelihood of finding sensitive packed decimals at the record location decreases further. However, other lengths of sensitive information may also be searched depending on the length. In certain embodiments, other types of potential packed decimal field patterns may be identified in order to rule out potential packed decimals and increase examination efficiency. For example, the leading edge of a packed decimal may easily be misidentified for EBCDIC characters, such as spaces, which are identified as 0x40. Since spaces in particular are very common in certain fields, the servicing and analysis engines 120 may stop considering a potential packed decimal after finding 3 consecutive leading spaces. In certain examples, this value may also be a configurable parameter.

Once viable sensitive information fields have been identified in step 620, in step 625, fields of other records corresponding to the viable sensitive information field location may be read. That is, the map may be generated based on a set of records that were examined for packed decimal indicators. The viable sensitive information fields identified by the map may be taken by the servicing and analysis engines 120 as indicative of the location of viable sensitive information fields in other records of a data set, which may not have been pre-examined or used to generate the map. Accordingly, these other records may not be examined for new packed decimal indicators by the servicing engine. Instead, the servicing engine may decode and analyze only a portion of records corresponding to viable sensitive information fields identified by the map.

Figure 7:
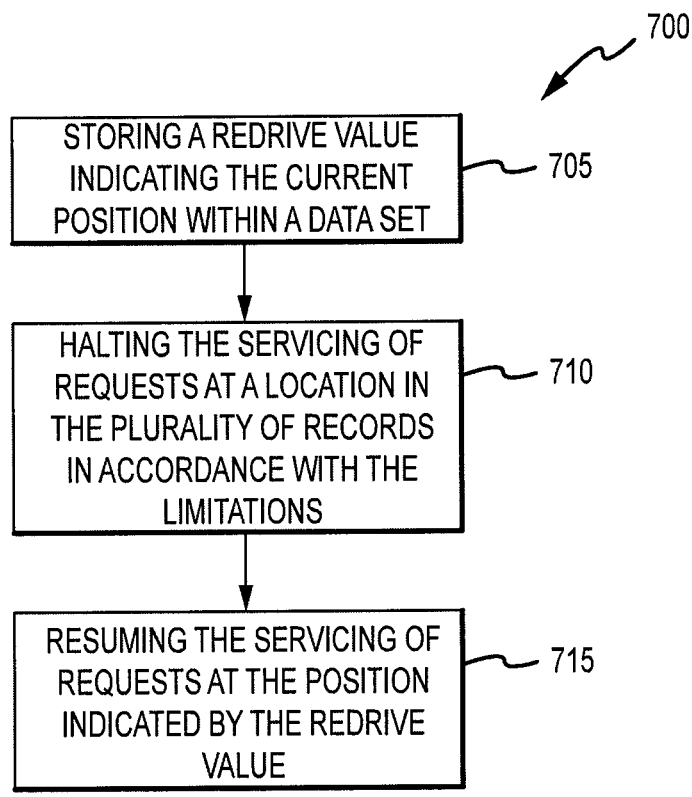
FIG. 7 is a schematic flowchart for one embodiment of a method using a redrive position to halt and restart a scan in accordance with an embodiment of the present invention.

For each scan definition there may be associated one or more analysis requests, each of which may include a representation of the criteria used by the servicing and analysis engine 120 to service and analyze a single data set to discover sensitive information that may reside in that data set. Recall with reference to FIG. 5 that data from the data set identified by the criteria in an analysis request may be read by the servicing engine in step 510 from a mainframe system in accordance with a scan definition in the course of servicing that analysis request. The scan definition itself may contain limitations regarding the timing of the servicing or the number of processes operating in all or a portion of the mainframe system. Moreover, global- or request-specific limitations may be stored in limits storage or other locations. The mainframe system itself, or the servicing and analysis engines themselves may additionally or instead contain global limitations. Data is read in step 510 in accordance with these limitations. FIG. 7 illustrates a schematic flowchart for one embodiment of a method 700 using a redrive operation during detection of sensitive information. The redrive operation allows for an analysis request servicing to be halted in accordance with limitations in a scan definition or global limitations, and to be effectively restarted at the end of the most recently processed data block of records prior to where the analysis request was halted. Accordingly, a redrive operation may permit resuming an interrupted analysis request, which may reduce mainframe overhead and increase overall efficiency.

In step 705, a redrive value representing the current data set position within each requested data set may be stored. The redrive value may be stored by the servicing engine 120 of FIG. 1 in any suitable storage medium. A redrive value may be periodically stored for each data set in an analysis request as the analysis request is being serviced. In some embodiments, the redrive position may be stored after a block of records has been analyzed. In some embodiments, the redrive position may be stored after a particular number of records have been serviced and analyzed. In some embodiments, a user may set the block size, essentially increasing or decreasing the frequency of storing the redrive position. Optionally, the redrive position may be updated additionally or instead on a per field basis. The redrive value may be stored in any storage device accessible to the servicing engine A separate redrive value may also be set for each data set within a group of data sets to be serviced and analyzed.

In step 710, servicing of requests may be halted when the limitations so indicate. According to some embodiments of the present invention, the servicing may be halted intentionally or unintentionally. The servicing of an analysis request may be halted intentionally, for example, if one of the above-described user-defined conditions or limitations has been met, such as exceeding the active requests per host or reaching the stop time in a schedule window. In some embodiments, servicing of analysis requests may also or instead be manually suspended by a command from a user on user subsystem 160. However, in certain embodiments servicing may become interrupted unintentionally in the event of a system failure. For example, a failure of the mainframe data repository 105 or mainframe data server 110 may prevent the servicing and analysis engines 120 from accessing the desired data set. Because the redrive position is stored proactively at a frequency and not only at events or conditions which programmatically cause the servicing of the request to be halted, the redrive operation may allow resuming an interrupted servicing of one or more requests even in the event of a system failure.

In step 715, when servicing is halted, servicing and analysis engines 120 may later resume servicing the one or more analysis requests by accessing the stored redrive value associated with each request, navigating to the position indicated by the redrive value specific to the request, and resuming the analysis request at that position. Analysis requests may be resumed at any time following a halt. Furthermore, analysis requests that were resumed may not necessarily be resumed in the same order or simultaneously, if multiple requests were simultaneously halted. The executable instructions for servicing 135 shown in FIG. 1 may contain instructions for these operation. Analysis requests may also be resumed upon receiving a manual resume command from a user on user subsystem 160, in some examples. Analysis servicing may be automatically resumed when the servicing engine determines no global limitations or limitations in the scan definition would prohibit servicing in some embodiments. The presence of a stored redrive value may also indicate to the servicing and analysis engines 120 that an analysis request was previously interrupted mid-analysis. Accordingly, this value may be examined at the start of a analysis request being serviced in order to avoid redundant servicing of already analyzed portions of the data set described by the analysis request.

Accordingly, methods and systems have been described above which analyze data stored in mainframe systems for sensitive information. Because the data stored in the mainframe system may not have a readily identifiable structure, structure may be inferred through a search for potential packed decimal indicators. Based on a pattern of the location of packed decimal indicators, structure may be inferred. Fields identified as likely to contain sensitive information may then be decoded and passed to an analysis engine for an analysis to identify the sensitive information. Accordingly, systems described herein may provide for automated analysis of data stored in mainframe systems for sensitive information. Allowing a user to identify sensitive information in their mainframe data may be advantageous in that it may allow the user to more accurately assess their risk of sensitive information exposure.

Moreover, embodiments of the present invention may advantageously minimize a burden placed on the mainframe server due to this analysis. In particular, in some embodiments the mainframe server is involved only to access the requested data and pass the data to a servicing and analysis engines. Because mainframe server processor cycles are often in high demand, performing the servicing and analysis using processing resources other than the mainframe's processor itself may be beneficial in that the impact to the mainframe server may be minimized.

From the foregoing it will be appreciated that, although specific embodiments of the invention have been described herein for purposes of illustration, various modifications may be made without deviating from the spirit and scope of the invention. For example, it is appreciated that some or all of the systems and methods disclosed herein may be adapted for use in identification of sensitive information in other computer systems, that is in addition to mainframes.

What is claimed is:

1. A method for controlling resource usage in the analysis of data including sensitive information and arranged in a plurality of records included in a plurality of data sets on a mainframe system, comprising:
    receiving an indication of names of data sets for analysis and a limitations relating to the analysis that includes a maximum number of threads concurrently running on the mainframe system;
    querying the mainframe system for a plurality of the named data sets to create a plurality of respective threads;
    determining the number of threads concurrently running on the mainframe system;
    querying the mainframe system for an additional named data set if the number of threads concurrently running on the mainframe system is not greater than the maximum number;
    analyzing the data arranged in the plurality of records that correspond to the named data sets to infer structure in the plurality of records to identify fields including the sensitive information;
    storing a redrive position;
    halting the analysis of the data arranged in the plurality of records at a data set position in accordance with the limitations before analyzing all the data arranged in the plurality of records;
    resuming the analysis at the redrive position in accordance with the limitations, wherein the redrive position including a data set position in the plurality of records prior to the data set position where the analysis was halted; and
    analyzing the identified fields for sensitive information.

2. The method of claim 1, wherein the limitations comprise a schedule window, and said halting the analysis is responsive to a first time being outside the schedule window, and said resuming the analysis is responsive to a second time being inside the schedule window.

3. The method of claim 1, wherein storing a redrive position comprises periodically storing a redrive position.

4. The method of claim 1, further comprising: halting the analysis as a result of a system failure; and resuming the analysis at the redrive position upon receiving a user resume command.

5. The method of claim 1, wherein the limitations comprise a maximum number of records to be analyzed, and said halting the analysis reading is responsive to a first number of records analyzed exceeding the maximum number of records to be analyzed.

6. The method of claim 1, wherein said analyzing the data is performed on a non-mainframe system.

7. The method of claim 1, wherein said halting the analysis is responsive to receiving a user halt command, and wherein said resuming the analysis is responsive to receiving a user resume command.

8. The method of claim 1, wherein the limitations comprise a maximum number of hits per scan, and said halting the analysis is responsive to a first number of hits exceeding the maximum number of hits per scan.

9. The method of claim 1, wherein the limitations comprise a minimum time delay, and said halting the analysis is responsive to a first time delay shorter than the minimum time delay, and said resuming the analysis is responsive to a second time delay that exceeds the minimum time delay.

10. One or more non-transitory computer readable storage media encoded with executable instructions when executed by one or more processing units causes the one or more processing unit to control resource usage in the analysis of data including sensitive information and arranged in a plurality of records included in a plurality of data sets on a mainframe system, comprising:
    receiving an indication of names of data sets for analysis and a limitations relating to the analysis that includes a maximum number of threads concurrently running on the mainframe system;
    querying the mainframe system for a plurality of the named data sets to create a plurality of respective threads;
    determining the number of threads concurrently running on the mainframe system;
    querying the mainframe system for an additional named data set if the number of threads concurrently running on the mainframe system is not greater than the maximum number;
    analyzing the data arranged in the plurality of records that correspond to the named data sets to infer structure in the plurality of records to identify fields including the sensitive information;
    storing a redrive position;
    halting the analysis of the data arranged in the plurality of records at a data set position in accordance with the limitations before analyzing all the data arranged in the plurality of records;
    resuming the analysis at the redrive position in accordance with the limitations, the redrive position including a data set position in the plurality of records prior to the data set position where the analysis was halted; and
    analyzing the identified fields for sensitive information.

11. The non-transitory computer readable storage media of claim 10, wherein the limitations comprise a schedule window, and said halting the analysis is responsive to a first time being outside the schedule window, and said resuming the analysis is responsive to a second time being inside the schedule window.

12. The non-transitory computer readable storage media of claim 10, wherein the limitations comprise a maximum number of records to be analyzed, and said halting the analysis is responsive to a first number of records analyzed exceeding the maximum number of records to be analyzed.

13. The non-transitory computer readable storage media of claim 10, wherein the limitation comprises a media type.

14. The non-transitory computer readable storage media of claim 13, wherein the media type is selected from the group consisting of hard disks, virtual tape, tape, hierarchic data, IMB, DB2 and Unix file systems.

15. A system for controlling resource usage in the analysis of data sensitive information and arranged in a plurality of records included in a plurality of data sets on a mainframe system comprising:
at least one processing unit coupled to a memory, wherein the memory is encoded with computer executable instructions that, when executed by the at least one processor unit causes the at least one processing unit to:
receive an indication of names of data sets for analysis and limitations relating to the analysis that includes a maximum number of threads concurrently running on the mainframe system;
query the mainframe system for a plurality of the named data sets to create a plurality of respective threads;
determine the number of threads concurrently running on the mainframe system;
query the mainframe system for an additional named data set if the number of threads concurrently running on the mainframe system is not greater than the maximum number;
analyze the data arranged in the plurality of records that correspond to the named data sets to infer structure in the plurality of records to identify fields including the sensitive information;
store a redrive position;
halt the analysis of the data arranged in the plurality of records at a data set position in accordance with the limitations before analyzing all the data arranged in the plurality of records;
resume the analysis at the redrive position in accordance with the limitations, the redrive position including a data set position in the plurality of records prior to the data set position where the analysis was halted; and
analyze the identified fields for sensitive information.

16. The system of claim 15, wherein the limitations comprise a schedule window, and said halting the analysis is responsive to a first time being outside the schedule window, and said resuming the analysis is responsive to a second time being inside the schedule window.

17. The system of claim 15, wherein the instructions further cause the at least one processing unit to: halt the analysis as a result of a system failure; and resume the analysis at the redrive position upon receiving a user resume command.

18. The system of claim 15, wherein the limitations comprise a maximum number of records to be analyzed, and said instructions further cause the at least one processing unit to halting the analysis responsive to a first number of records analyzed exceeding the maximum number of records to be analyzed.

19. The system of claim 15, wherein said instructions further cause the at least one processing unit to analyze on a non-mainframe system.

20. A method for controlling resource usage in the analysis of data including sensitive information and arranged in a plurality of records included in a plurality of data sets on a mainframe system, comprising:
receiving an indication of names of data sets for analysis and a limitation relating to the analysis that includes a maximum number of threads concurrently running on the mainframe system;
querying the mainframe system for a plurality of the named data sets to create a plurality of respective threads;
determining the number of threads concurrently running on the mainframe system; querying the mainframe system for an additional named data set if the number of threads concurrently running on the mainframe system is not greater than the maximum number;
analyzing the data arranged in the plurality of records that correspond to the named data sets to infer structure in the plurality of records to identify fields including the sensitive information; and
analyzing the identified fields for sensitive information so as to permit an assessment of the risk of unauthorized access to the sensitive information.

21. The method of claim 20, wherein said analyzing the data is performed on a non-mainframe system.

22. One or more non-transitory computer readable storage media encoded with instructions executable by one or more processing units of a computing system controlling resource usage in the analysis of data including sensitive information and arranged in a plurality of records included in a plurality of data sets on a mainframe system, the instructions comprising instructions for: receiving an indication of names of data sets for analysis and a limitation relating to the analysis that includes a maximum number of threads concurrently running on the mainframe system; querying the mainframe system for a plurality of the named data sets to create a plurality of respective threads; determining the number of threads concurrently running on the mainframe system; querying the mainframe system for an additional named data set if the number of threads concurrently running on the mainframe system is not greater than the maximum number; analyzing the data arranged in the plurality of records that correspond to the named data sets to infer structure in the plurality of records to identify fields including the sensitive information; and analyzing the identified fields for sensitive information so as to permit an assessment of the risk of unauthorized access to the sensitive information.

23. The non-transitory computer readable storage media of claim 22, wherein said analyzing the data is performed on a non-mainframe system.

* * * * *